(12) United States Patent
Gehrking

(10) Patent No.: US 7,675,505 B1
(45) Date of Patent: Mar. 9, 2010

(54) FINGER AND PALM SUPPORT ATTACHMENT FOR A COMPUTER MOUSE

(76) Inventor: Robert Dean Gehrking, 216 N. Washington Ave., Spring Valley, MN (US) 55975

( * ) Notice: Subject to any disclaimer, the term of this patent is extended or adjusted under 35 U.S.C. 154(b) by 791 days.

(21) Appl. No.: 11/511,194

(22) Filed: Aug. 28, 2006

(51) Int. Cl.
*G09G 5/08* (2006.01)
(52) U.S. Cl. .................................... 345/163; 345/156
(58) Field of Classification Search ......... D14/402–410
See application file for complete search history.

(56) References Cited

U.S. PATENT DOCUMENTS

| | | | | |
|---|---|---|---|---|
| 5,260,696 A | * | 11/1993 | Maynard, Jr. ............... | 345/163 |
| 5,340,067 A | * | 8/1994 | Martin et al. ............. | 248/118.5 |
| 5,576,733 A | * | 11/1996 | Lo .............................. | 345/163 |
| 5,892,499 A | * | 4/1999 | Vulk, Jr. ..................... | 345/156 |
| 5,949,406 A | * | 9/1999 | Kress .......................... | 345/163 |
| 6,362,811 B1 | * | 3/2002 | Edwards et al. ............. | 345/163 |
| 7,212,191 B2 | * | 5/2007 | Snijders ...................... | 345/163 |
| 2006/0209026 A1 | * | 9/2006 | Balmes ....................... | 345/163 |

* cited by examiner

*Primary Examiner*—Bipin Shalwala
*Assistant Examiner*—Daniel Bedell

(57) ABSTRACT

A computer mouse accessory that rests on top of a computer mouse and holds the user's finger while working with the computer mouse and its buttons. The accessory has a body that fits the user's palm and finger support for user's finger while using a computer mouse.

1 Claim, 6 Drawing Sheets

FINGER AND PALM SUPPORT ATTACHMENT FOR A COMPUTER MOUSE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

1. Field of the Invention

This invention relates generally to computer pointing devices, commonly referred to as computer mice, the present invention relates to an attachable device for computer pointing devices.

2. Description of the Prior Art

The mouse is a common computer pointing device that allows the user to move the cursor on a computer screen by moving the pointing device on a surface and quickly clicking one of the buttons to activate the selected command. Some mice also contain an optional scrolling wheel for scrolling through the data displayed on the computer screen. Unfortunately, computer mice are uncomfortable to use for any extended length of time, and they may create Repetitive Strain Injury after sustained use. There are many ergonomic computer mice designed to alleviate this problem, but they are complete computer mouse devices consisting of all components needed in a functioning computer mouse. They are very expensive.

However, there is no prior art similar to the present invention.

Computer mice have been in existence for decades, and my invention is an attachable device that makes computer mice more comfortable to use. The present invention is for use on existing computer mice, and utilizes the body and controls of whichever existing computer mouse it is attached to.

SUMMARY OF THE INVENTION

Computer manufacturers include a computer mouse with each computer they manufacture. These mice are not ergonomically designed, and are uncomfortable to use. Aftermarket computer mice are better designed for comfort, but still fail to be very comfortable to use because the users hand is still very horizontal, and the wrist is still twisted in an uncomfortable position. The present invention can be attached to these mice, and the present invention then helps support the hand in a more relaxed, more vertical, more neutral position and allows for easier, more comfortable manipulation and operation of the buttons on these computer mice. A good material for constructing this device is a soft, flexible material, such as rubber or silicone. The Index Finger Support of the present invention is resilient and helps support the index finger and can be made to actually rebound after being depressed by the index finger. This helps eliminate the stress on the index finger caused by the need to constantly hold the index finger in an elevated position to prevent the activation of the buttons as is needed on the standard computer mouse. This helps make the mice more comfortable and helps reduce the stress caused by using them. My invention helps supply superior ergonomic features to computer mice by providing support for fingers, inner palm surface, and allows the users hand and wrist to lie in a more natural, more straight, more comfortable position on the mouse pad or desk top. The invention allows the fingers to be in their naturally curled positions if desired by the user.

In another embodiment, the Index Finger Support is extended to make a complete loop and is terminated at, or connected to, the body of the present invention as desired. This allows for a larger finger support area if the user desires such an increase. This variation is named Optional Closed Index Finger Support.

The present invention provides flexible fitting to a wide range of hand or palm sizes.

The present invention may be made in any size needed to accommodate the needs or desires of a user or of a fore-seen user.

ADVANTAGES

An advantage of the present invention is to provide for the comfortable use of even the most rudimentary off-the-self, standard computer mouse. Accordingly one or more embodiments of the present invention may have one or more of the following advantages:

It is an advantage of the present invention; to provide an attachable device to a computer mouse which has an external contour which substantially conforms to the mean of the contour of the palm side surface of the hand when the hand is in a relaxed neutral position with the palm surface in a comfortable, fairly vertically disposed orientation.

Another advantage is to provide an attachable device to a computer mouse which is of a size and has an external contour so that the mouse will nest substantially in the hand of the user, with the palm surface of the hand positioned mostly vertically, and while the wrist is maintained in a position of neutral radial-ulnar deviation, and the forearm is maintained in a position of neutral pronation-supination.

Another advantage of the present invention is to provide an attachable device to a computer mouse which provides superior, substantially sustained support of the users index finger and also provides substantial or periodic support for various other of the users fingers as desired by the user, selected by the variable positioning of the users hand about and on the present invention.

The above and other advantages and features of the present invention will become more apparent when considered with reference to the following drawings.

BRIEF DESCRIPTION OF THE DRAWINGS

First Embodiment

Second Embodiment

Figure 6:
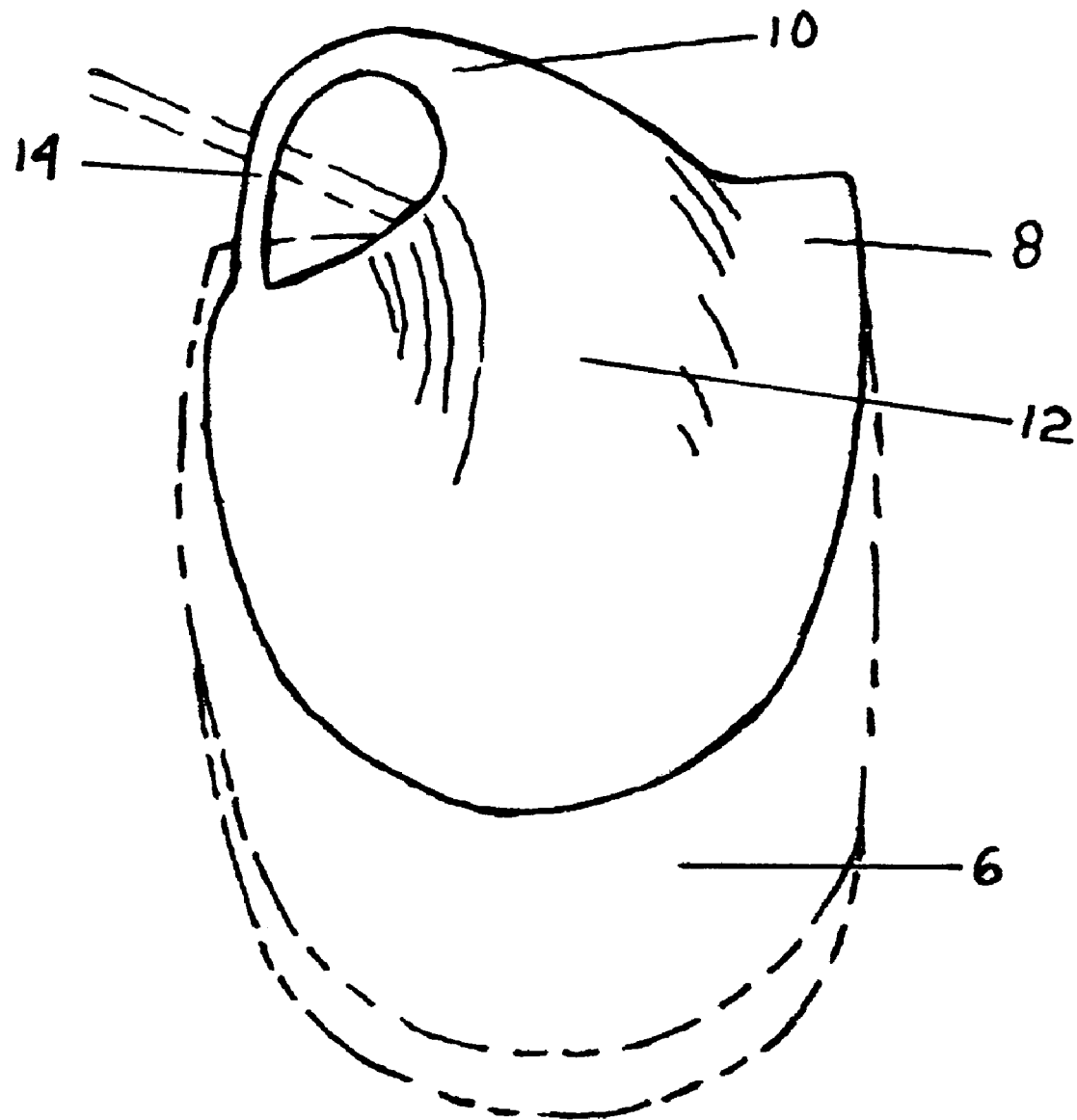

FIG. 6 is a rear view of the second embodiment. It shows the Optional Closed Index Finger Support. Such an embodiment will supply a greater finger support area and also additional resiliency in the rebound provided to the users index finger.

LIST OF REFERENCE NUMERALS

| 6 | off-the-self computer mouse |
|---|---|
| 8 | side support |
| 10 | Index Finger Support |
| 12 | body |
| 14 | Optional Closed Index Finger Support |

DETAILED DESCRIPTION OF THE INVENTION

The following discussion describes in detail the present invention and one variation of that invention. This discussion should not be construed, however, as limiting the present invention to these particular embodiments; practitioners skilled in the art will recognize numerous other embodiments as well. For definition of the complete scope of the invention, the reader is directed to the appended claims.

Figure 1:
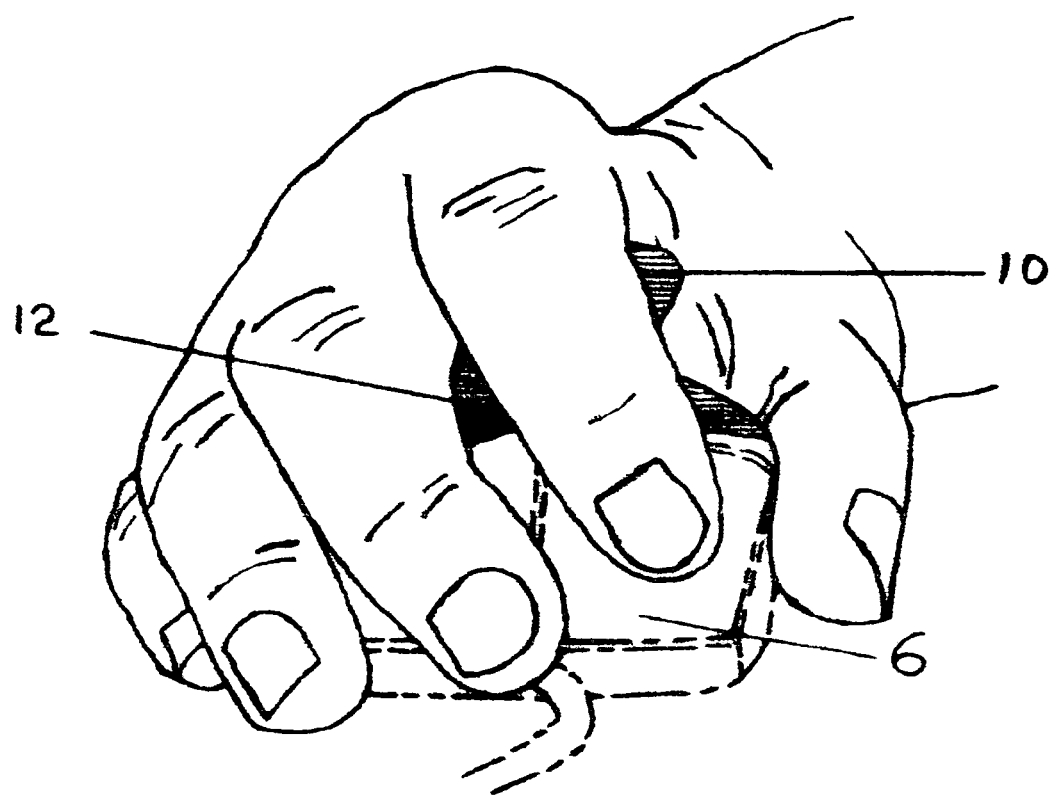
FIG. 1 is a front view of the present invention, showing the embodiment mounted on a simple 2 button mouse and being grasped by the users right hand. Examination of the view shows the users fingers are supported by the present device. Especially the users index finger, which is being supported by the rebounding Index Finger Support.

FIG. 1 is a front view of the present invention, showing the present invention attached to a simple 2 button, off-the-self, standard computer mouse (6) and being grasped by the users right hand. Examination of the view shows the users fingers are supported by the body (12) of the present invention. Especially the users index finger, which is being supported by the somewhat flexible, rebounding Index Finger Support (10) and with the users thumb resting comfortably about the left side of the standard computer mouse. The body of the invention (12) is of a size and weight to fit snugly into the particular user's hand, and to help support the user's hand in a more comfortable, more vertical, more neutral position then that allowed by standard computer mice. The present invention can be attached to standard computer mice (6), and the invention then helps supports the hand in a more relaxed, more vertical, more neutral position and allows for easier, more comfortable manipulation and operation of the buttons on these computer mice (6). A good material for constructing this device is a soft, flexible material, such as rubber or silicone. The Index Finger Support (10) of the present invention is fairly resilient and helps support the index finger and can be made to actually rebound after being depressed by the index finger. This helps eliminate the stress on the index finger caused by the need to constantly hold the index finger in an elevated position to prevent the activation of the buttons as is needed on the standard computer mouse (6). This helps make the standard mouse (6) more comfortable and helps reduce the stress caused by using it. The present invention helps supply superior ergonomic features to computer mice (6) by helping to provide support for fingers, inner palm surface, and allows the users hand and wrist to lie in a more natural, more straight, more comfortable position on the mouse pad or desk top. The present invention allows the fingers to be in their naturally curled positions if so desired by the user.

Figure 2:
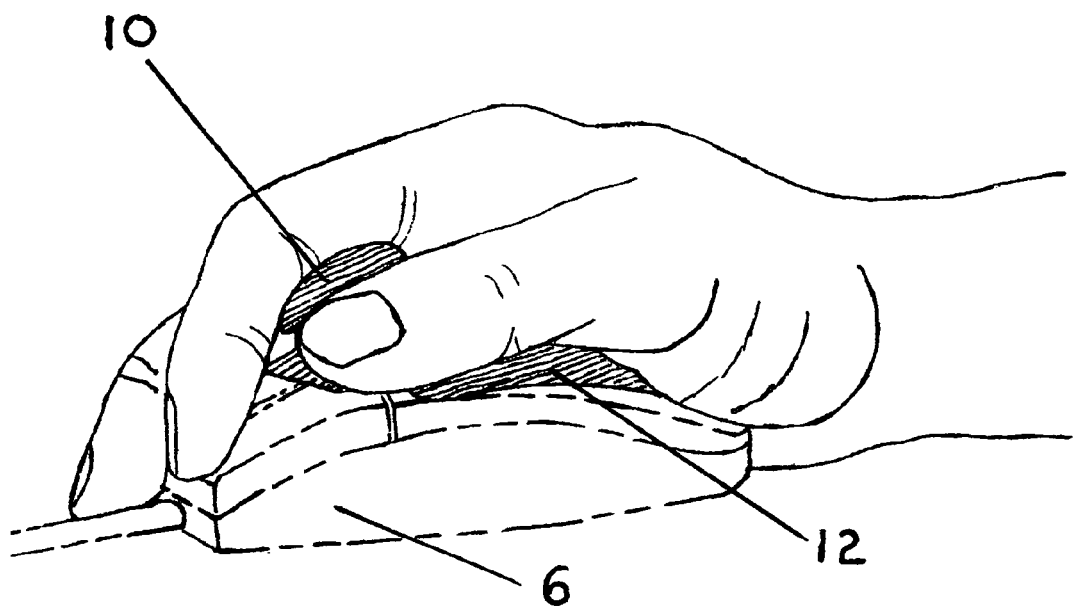
FIG. 2 is a view of the left hand side of the invention, showing the embodiment grasped by the users right hand as it is installed on a simple two button computer mouse. The view illustrates the user resting his thumb on the left side of the present inventions body area.

FIG. 2 is a left side view of the present invention attached to a standard computer mouse (6) and showing the users thumb resting up on the left side of the present invention.

Figure 3:
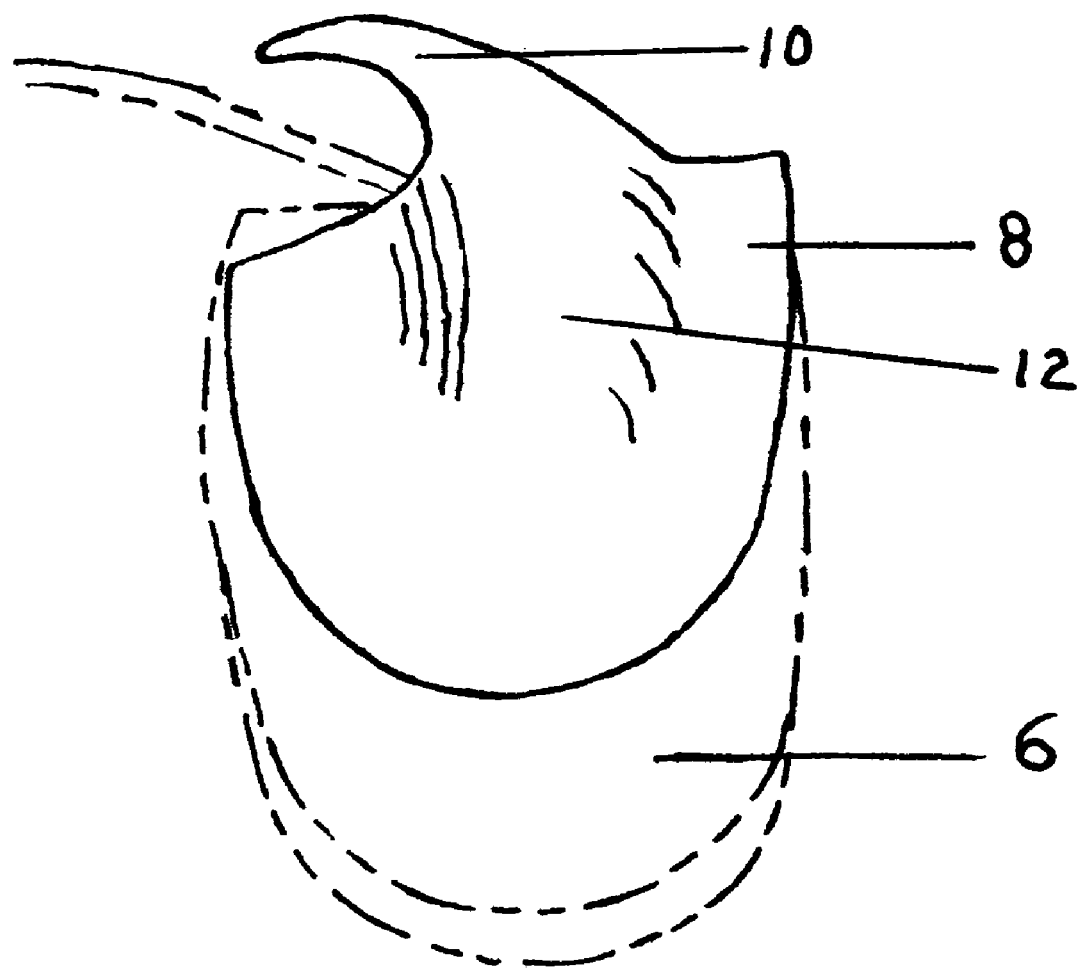
FIG. 3 is a view of the rear of the present invention, with said computer mouse installed into the present invention and showing the side support for the users fingers.

FIG. 3 is a rear view of the present invention attached to a standard computer mouse (6) and shows the side support (8) area which may be used to provide additional area for support of the users second or third finger if so desired by the user.

Figure 4:
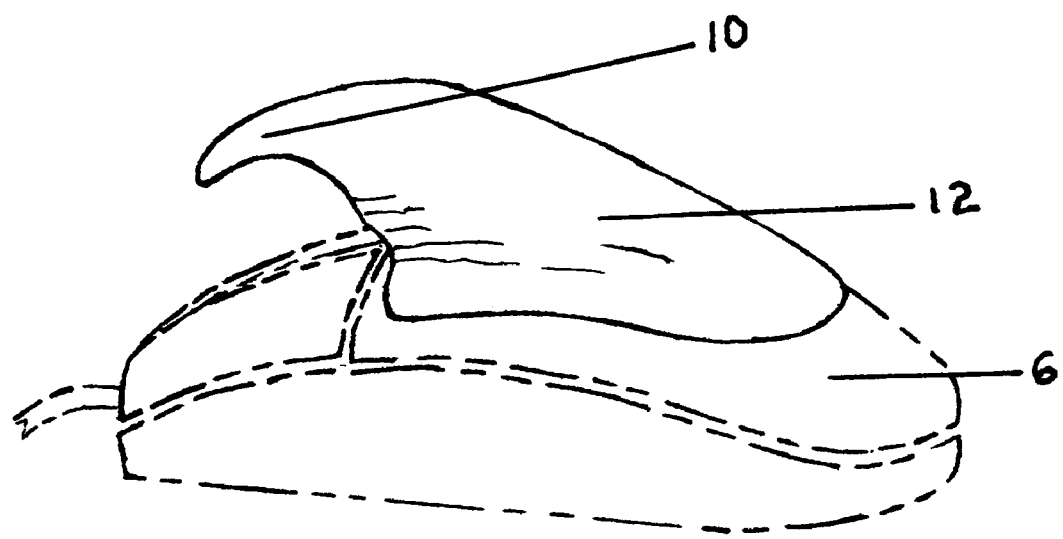
FIG. 4 is a representation of the left hand side of the invention as it is installed on a computer mouse.

FIG. 4 is a left side view of the present invention attached to a standard computer mouse (6).

Figure 5:
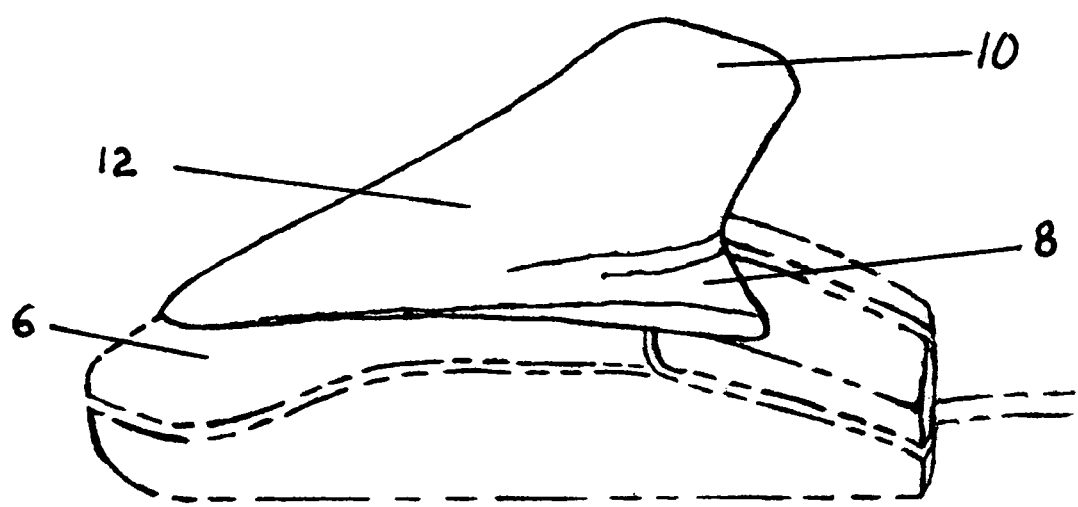
FIG. 5 is a right side view of the present invention as it is attached to a computer mouse.

FIG. 5 is a right side view of the present invention attached to a standard computer mouse (6).

FIG. 6 is a rear view of a second embodiment of the present invention. In this embodiment the index finger support (10) is extended to make a complete loop, and is terminated or merged with the body (12) of the present embodiment if desired, creating the Optional Closed Index Finger Support (14). This allows for a larger finger support area if the user desires such an increase and also an increase in resiliency and rebound ability of the Optional Closed Index Finger Support (14) due to the added stabilizing influence added by the relatively circular extension.

A good material to make the present invention from would be a soft resilient material such as rubber or silicone. However it may be made of plastic for manufacture by injection or any other means; however, resiliency of the Index Finger Support (10) would be lost. However, the shape of the present invention would still help provide support for the user's index finger and other fingers. The body (12) may be made in any size or thickness desired. The body (12) of the present invention may be attached to the selected computer mouse (6) by any convenient manner. Many attachment means can be used, including hook-and-loop fasteners (Velcro), double-sided tape, double-sided foam tape, adhesive, and other techniques known to those skilled in the art.

Also, since the present invention is somewhat circular in shape it is easy for the user to position his hand in any comfortable manner about the device that he desires. In addition, the body (12) of the present invention may be altered for functional reasons, or to accommodate different hand sizes, or for ornamental reasons or for both. Functional features may be related to hand size or to left/right handedness or to other requirements.

Those skilled in the art will appreciate that the dimensions of the present invention may vary considerably.

The present invention has clear advantages over the prior art. For a computer owner to make his computer mouse more comfortable and ergonomic, a computer owner only has to purchase the present invention. It is an inexpensive ergonomic attachable device that is designed for use on any computer mouse in his possession. There is no need to discard the computer mouse that he has and buy a more expensive replacement for comfort. The present invention will make his present computer mouse more comfortable than what is available at Best Buy.

Although the invention has been described with reference to specific variations, this description is not meant to be construed in a limiting sense. Various modifications of the disclosed invention, as well as alternative variations of the present invention, will become apparent to persons skilled in the art upon reference to the description of the present invention. It is therefore contemplated that such modifications can be made without departing from the spirit or scope of the present invention as defined in the appended claims.

What is claimed is:

1. An accessory for a computer mouse, the computer mouse being operable by a user's hand having a palm, a thumb and an index finger, wherein the user's index finger curls when relaxed, the computer mouse having a front end, a rear end, an upper surface, and an upward facing, depressible mouse button positioned at the front end of the mouse, the accessory comprising:

a finger support; and means for attaching the finger support to the upper surface of the computer mouse, such that the finger support extends upward from the upper surface of the computer mouse under the user's index finger when a portion of the user's palm rests on the upper surface of the computer mouse at the rear end of the computer mouse and the user's index finger is directed toward the mouse button at the front end of the computer mouse, wherein the finger support includes an upper support surface shaped such that when the user relaxes the index finger, thereby allowing the index finger to curl, the upper support surface of the finger support substantially conforms to the curl of the user's relaxed index finger and supports the index finger such that the tip of the index finger resides above and proximate to the mouse button without depressing the mouse button, while allowing the user to thereafter flex the tip of the index finger downward to depress the mouse button without removing the index finger from the upper support surface, and wherein the finger support includes a lateral recess shaped and positioned to receive the thumb of the user's hand.

* * * * *